(12) United States Patent
Tanada et al.

(10) Patent No.: US 6,537,946 B1
(45) Date of Patent: Mar. 25, 2003

(54) EXHAUST GAS PURIFYING CATALYST

(75) Inventors: Hiroshi Tanada, Okazaki (JP); Osamu Nakayama, Toyota (JP); Keisuke Tashiro, Okazaki (JP); Kinichi Iwachido, Aichi (JP); Tetsuya Watanabe, Okazaki (JP)

(73) Assignee: Mitsubishi Jidosha Kogyo Kabushiki Kaisha (JP)

(*) Notice: Subject to any disclaimer, the term of this patent is extended or adjusted under 35 U.S.C. 154(b) by 0 days.

(21) Appl. No.: 09/642,366

(22) Filed: Aug. 21, 2000

(30) Foreign Application Priority Data

Aug. 20, 1999 (JP) ............................ 11-234359
Dec. 27, 1999 (JP) ............................ 11-370357
Dec. 27, 1999 (JP) ............................ 11-370358

(51) Int. Cl.$^7$ ............................ B01J 23/02; B01J 8/02; B01D 50/00; B32B 19/00; B21D 51/16
(52) U.S. Cl. ............................ 502/344; 502/64; 502/308; 502/309; 502/311; 502/312; 502/317; 502/527.12; 502/527.13; 502/527.15; 422/177; 422/178; 422/179; 422/180; 423/213.2; 423/213.5; 423/239.1; 428/689; 29/890
(58) Field of Search ............................ 502/64, 317, 308, 502/309, 311, 312, 344, 527.12, 527.13, 527.15; 29/890; 422/177–180; 423/213.2, 213.5, 239.1; 428/689

(56) References Cited

U.S. PATENT DOCUMENTS

| | | | | |
|---|---|---|---|---|
| 5,340,548 A | * | 8/1994 | Abe et al. | 422/177 |
| 6,004,521 A | * | 12/1999 | Miyoshi et al. | 423/213.5 |
| 6,066,587 A | * | 5/2000 | Kurokawa et al. | 506/66 |
| 6,149,877 A | * | 11/2000 | Ogai | 422/180 |
| 6,217,831 B1 | * | 4/2001 | Suzuki et al. | 422/177 |
| 6,221,804 B1 | * | 4/2001 | Yamada et al. | 502/326 |

* cited by examiner

*Primary Examiner*—Mark L. Bell
*Assistant Examiner*—Partricia L. Hailey
(74) *Attorney, Agent, or Firm*—Rossi & Associates

(57) ABSTRACT

In an exhaust gas purifying catalyst, an acid material with a high affinity with respect to an absorbing agent is dispersed and mixed in a catalyst layer, to which the absorbing agent is added, or a layer of the acid material is formed inside the catalyst layer in order to prevent the absorbing agent from moving from the catalyst layer into the carrier. This reduces the permeation of the absorbing agent added to the catalyst layer into a carrier, the evaporation and splash of the absorbing agent from the catalyst, and the deterioration in the durability and the exhaust gas purifying performance of the catalyst.

13 Claims, 6 Drawing Sheets

120 silica layer
130 catalyst layer
110 cordierite carrier 130 catalyst layer
140 titania layer
110 cordierite carrier A : original
B : zeolite layer
C : silica layer
D : titania layer

EXHAUST GAS PURIFYING CATALYST

BACKGROUND OF THE INVENTION

1. Field of the Invention

The present invention relates generally to an exhaust gas purifying catalyst, and more particularly to an exhaust gas purifying catalyst that is able to keep a high purifying performance.

2. Description of Related Art

A lean combustion type engine such as a lean burn engine and a cylinder fuel injection type engine is run at a lean air-fuel ratio that is lean than a stoichiometrical air-fuel ratio, in a predetermined running range in order to improve a fuel consumption characteristic and an exhaust gas characteristic. While the engine is run at the lean air-fuel ratio, a three way catalyst cannot satisfactorily purify NOx (nitrogen oxide) in an exhaust gas. Therefore, it is well known that there is provided an NOx catalyst that absorbs the NOx in the exhaust gas in an oxide atmosphere, and the NOx absorbed by this catalyst is reduced to $N_2$ (nitrogen) in an reducing atmosphere to thereby reduce the amount of NOx discharged into the air. An example of such an occlusion-type lean NOx catalyst is disclosed in Japanese Patent Provisional Publication No. 9-85093, potassium (K) as one of alkali metals is added as an NOx absorbing agent to the catalyst in order to improve an NOx absorbing performance.

If, however, the NOx catalyst to which the potassium is added is used at a high temperature for a long period of time, the catalyst may be cracked. This results in the deterioration in the durability of the NOx catalyst.

In order to discover the cause of the deterioration in the durability, the inventors of the present invention manufactured an NOx catalyst, in which potassium as one of alkali metals is added as an NOx absorbing agent to a catalyst layer held in a honeycomb cordierite carrier (a porous carrier), and conducted a bench test of an engine equipped with this NOx absorbing agent and a running test of a vehicle provided with this engine. In the bench test and the vehicle running test, the engine and the vehicle were run under the condition that the NOx catalyst was exposed to a high temperature of not less than 650° C. for a long period of time. After the running of the engine and the vehicle, an element analysis was conducted with respect to a cut surface of the NOx catalyst by an EPMA method (an electron beam probe micro part analysis method). As a result, it was found that a compound of $KMg_4Al_9Si_9O_{36}$ of potassium, magnesium, aluminum, silicon and oxygen and a compound $KAlSiO_4$ of potassium, aluminum, silicon and oxygen were present in a cordierite ($Mg_2Al_4Si_5O_8$) layer of the catalyst.

According to the above tests, if the NOx catalyst is exposed to a high temperature, the potassium added to the catalyst layer (a wash coat) permeates the cordierite carrier, and reacts with the cordierite in a hightemperature atmosphere. It can be considered that the potassium easily permeates the cordierite carrier because the potassium compound has a high water solubility and a low fusing point. When a compound with a different coefficient of thermal expansion from the cordierite is formed in the cordierite carrier, the cordierite carrier is cracked with the change in a catalyst temperature during the use of the catalyst and before and after the use of the catalyst.

As stated above, the NOx catalyst including the potassium and the like as the absorbing agent is used in the oxide atmosphere.

In the oxide atmosphere, the absorbing agent chemically reacts with nitrogen components and sulfur components in the exhaust gas to thereby form a nitrate and a sulfate of the catalyst. This deteriorates the NOx absorbing performance. The absorbing performance can be recovered by forming the reducing atmosphere around the NOx catalyst and dissolving the nitrate and the sulfate. In this case, however, the purifying performance may be deteriorated if the NOx catalyst is used at a high temperature for a long period of time.

According to the results of the tests conducted by the inventors of the present invention, one of the causes of the deterioration in the purifying performance is considered to be that the absorbing agent is gradually evaporated and splashed from the NOx catalyst at a high temperature and therefore a considerable amount of the absorbing agent is dissipated. More specifically, the inventors of the present invention manufactured the NOx catalyst in which the catalyst layer including the potassium as the absorbing agent is held in the cordierite carrier, and found a potassium content of an unused NOx catalyst by an XRF method (an X-ray fluorescence analysis method). Then, they found the potassium content of the catalyst after the use of the catalyst at a high temperature for a long period of time (e.g., at 850° C. for 32 hours), and then found the dissipated amount of the potassium by dividing a difference in the potassium content before and after the use of the catalyst by the original potassium content. Consequently, the dissipated amount of the potassium was found to be dozens of % to 50%.

It is therefore an object of the present invention to provide an exhaust gas purifying catalyst that is able to significantly reduce the degree to which the exhaust gas purifying performance is deteriorated due to the dissipation of the absorbing agent.

SUMMARY OF THE INVENTION

It is therefore an object of the present invention to provide an exhaust gas purifying catalyst that is able to significantly reduce the degree to which the exhaust gas purifying performance is deteriorated due to the dissipation of the absorbing agent.

The above object can be accomplished by providing an exhaust gas purifying catalyst, which includes a carrier and a catalyst layer and in which at least one of alkali metals and alkali earth metals is added as an absorbing agent to the catalyst layer, the exhaust gas purifying catalyst wherein: an inhibiting agent is provided in the catalyst layer in order to inhibit the movement of the absorbing agent in the catalyst. This inhibits the movement of the absorbing agent in the catalyst, and prevents the dissipation of the absorbing agent due to the evaporation, splash, etc. of the absorbing agent from the catalyst, and the deterioration in the exhaust gas purifying performance of the catalyst.

Preferably, the inhibiting agent is dispersed and mixed in the catalyst layer, or is provided in a form of a layer in the catalyst. Only diffusing and mixing the inhibiting agent in the catalyst layer inhibits the movement of the catalyst, but the movement of the inhibiting agent can be surely prevented by providing the inhibiting agent in the form of the layer.

Preferably, the inhibiting agent includes an acid oxide including at least one acid substance selected from transition elements of IV, V and VI groups and typical elements of IV, V and VI groups; a composite oxide including the at least one acid substance; and at least one material selected from a group composed of a material that never disturbs a reactivity between a nitrogen oxide and the absorbing agent and a material that absorbs a reduced substance. In this case, the inhibiting agent may include zeolite or include an acid oxide comprised of at least one acid substance among silica, titanium and tungsten.

Preferably, the absorbing agent includes potassium, and the carrier is comprised of a porous carrier.

Moreover, the layer of the inhibiting agent preferably comprises at least one of the following: a layer with a high acidity, a layer with a large specific surface, a layer with a small crystal lattice, a layer composed of an element compound with a heavy molecular weight, and a layer with a high basicity.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Preferred embodiments of an exhaust gas purifying catalyst according to the present invention will be described hereinbelow.

First, a description will be given of the first and second embodiments wherein an inhibitor is dispersed and mixed in a catalyst layer.

Figure 1:
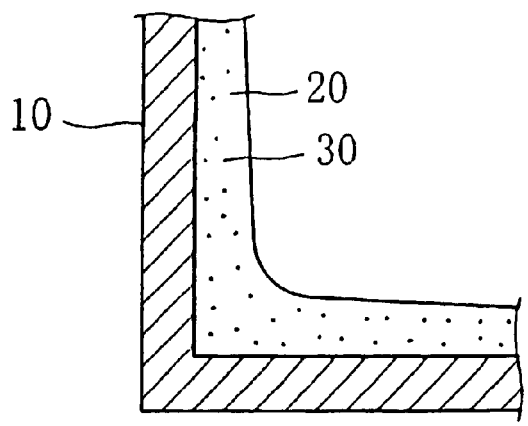
FIG. 1 is a partially-enlarged cross-sectional view showing a quarter of a shell in an exhaust gas purifying catalyst according to a first embodiment of the present invention.

The exhaust gas purifying catalyst is an NOx catalyst having an honeycomb cordierite carrier composed of many cells. FIG. 1 shows a part of a cell in the cordierite carrier. The cell of the cordierite carrier 10 is, for example, quadrangular. A catalyst layer 20 is held on a surface of the cordierite carrier 10. The cordierite carrier 10 is produced by, for example, mixing alumina powder, silica powder and magnesia powder so that the ratio thereof can conform to the composition of a cordierite, diffusing the mixed powder in water, forming a solid content thereof in the shape of a honeycomb, and sintering the honeycomb compact.

For example, the catalyst 20 is formed in a manner described below. First, a slurry including a noble metal such as platinum, an alkali metal or an alkali earth metal such as potassium (K) and barium (Ba) as an NOx absorbing agent, an acid material (an inhibitor) 30 such as silicon (Si), and the like is prepared. Then, the cordierite carrier 10 is immersed in the slurry, and is dried and sintered. Consequently, the acid material 30 is mixed in the catalyst layer including the noble metal and the alkali metal or the alkali earth metal.

Figure 2:
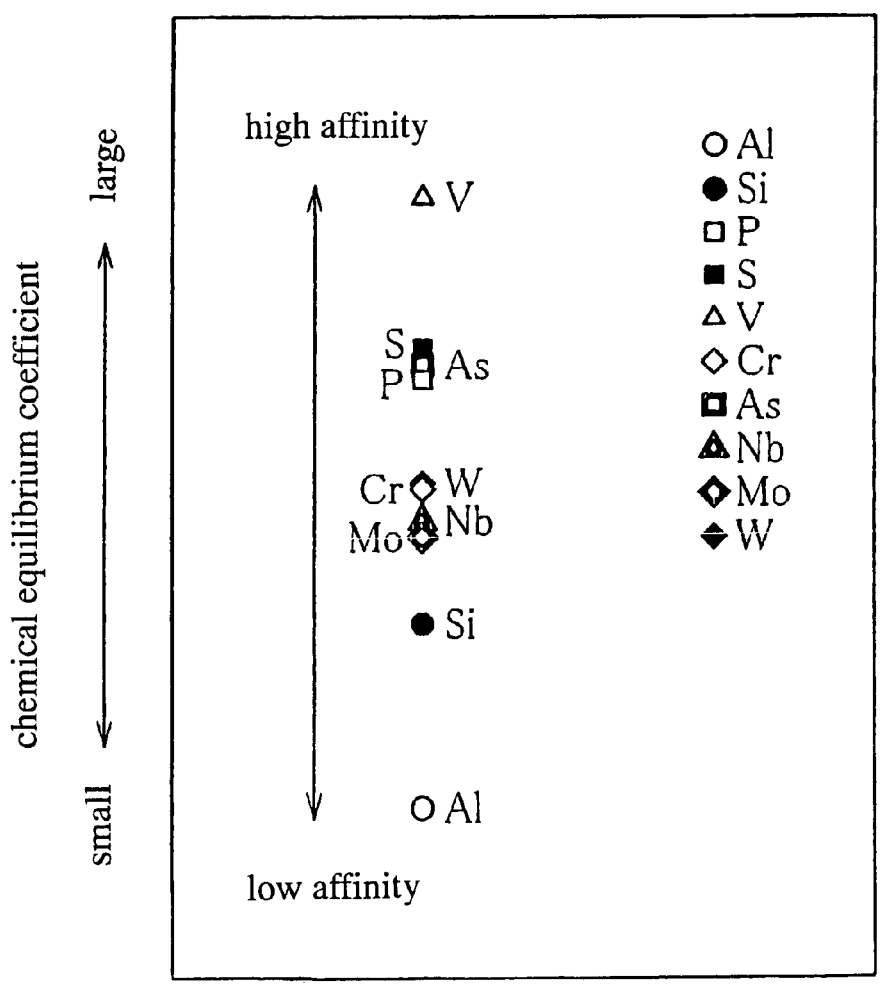
FIG. 2 is a view showing the affinity with respect to potassium of an acid material.
Figure 3:
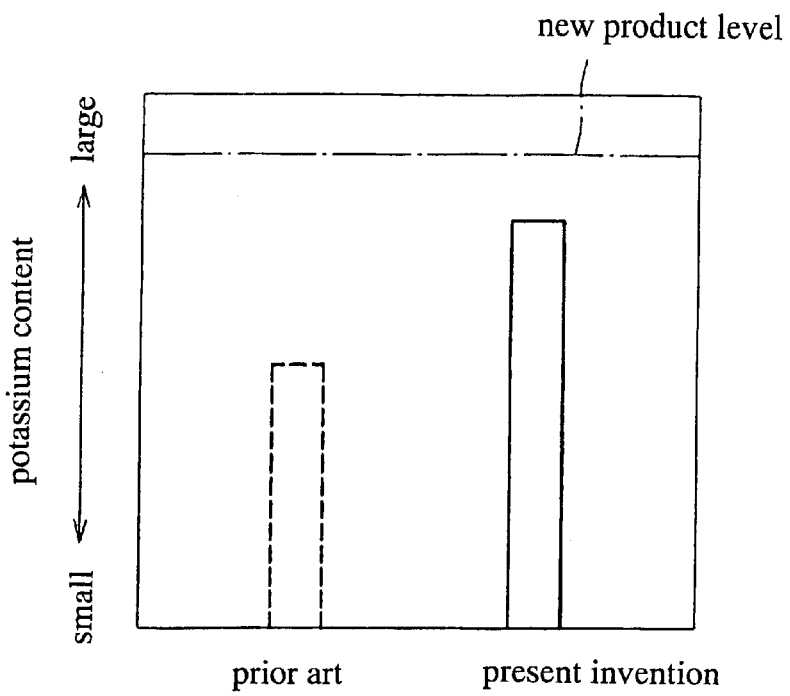
FIG. 3 is a view showing a potassium content of a catalyst layer after an exhaust gas purifying catalyst is used at a high temperature for a long period of time.

The NOx absorbing agent is typically formed of potassium (K) or barium (Ba), but the present invention is not restricted to this specific example. The NOx absorbing agent may be formed of any kinds of alkali metals or alkali earth metals. The acid material (the inhibitor) 30 is typically formed of silica (silicon oxide), but as shown in FIG. 2, the oxide material 30 may be formed of any kinds of transition elements of IV, V and VI groups or typical elements (e.g., P, S, V, Cr, As, Nb, Mo, W) of IV, V and VI groups. Preferably, the acid material 30 has a high affinity with respect to the alkali metal or the alkali earth metal as shown in FIG. 2 (FIG. 2 shows the affinity with respect to the potassium for example). If a reactivity with respect to the NOx absorbing agent is taken into consideration, the acid material 30 is preferably silicon (Si) or tungsten (W) in the case where the NOx absorbing agent is formed of the potassium. Preferably, the acid material 30 never disturbs the reactivity with respect to the NOx and the NOx absorbing agent.

The acid material 30 may be a composite material if it has the affinity with respect to the NOx absorbing agent. Therefore, the acid material 30 may be zeolite, which has a cation exchange ability equivalent to the affinity.

The above processing acquires an NOx catalyst in that the cordierite carrier 10 is coated with the catalyst layer 20. As is well known, the NOx catalyst is contained in a case through a cushioning material, and the case is arranged in an exhaust pipe of a lean bum internal combustion engine.

The NOx catalyst absorbs NOx as nitrate in an exhaust gas under the operation of catalyst species dispersed in the catalyst layer 20 while the engine is run at a lean air-fuel ratio. When the engine is run at a rich air-fuel ratio, the nitrate is dissolved, and the absorbed NOx is reduced to nitrogen and is emitted from the NOx catalyst into the air.

If the internal combustion engine provided with the NOx catalyst is run for a long period of time, the NOx catalyst is exposed to a high temperature. If the NOx catalyst is a conventional NOx catalyst whose cordierite carrier is coated with a catalyst layer to which the potassium or the barium (hereinafter only referred to as the potassium) as the NOx catalyst is only added, the potassium moves to the cordierite carrier to react with silica components and the like in the carrier to produce a compound and crack the cordierite carrier. This damages the durability of the NOx catalyst.

According to an elementary analysis by an EPMA method, the NOx catalyst of the present embodiment prevents the production of the compound of the potassium added to the catalyst layer 20 and the silica components of the cordierite carrier 10 even if the NOx catalyst is used at a high temperature for a long period of time. This is because the acid material 30 such as the silicon as well as the potassium is mixed in the catalyst layer 20, and therefore the potassium is dispersed in and is attracted to acid material particles due to the affinity of the acid material 30 so that the potassium can desirably be held without moving in the catalyst layer 20.

When the potassium content of the catalyst layer 20 was measured after the NOx catalyst was used at a high temperature for a long period of time, it was found that a considerable amount of potassium still remained in the catalyst layer 20 compared with the case where the catalyst layer, in which the acid material was not mixed, was used as in the prior art (indicated by a broken line).

Moreover, the reason why a considerable amount of potassium remains in the catalyst layer 20 is as follows. In the case of the conventional NOx catalyst, the nitrate of the potassium has a low fusing point, and thus, the potassium easily moves in the catalyst if it is exposed to a high temperature, and is easily evaporated and splashed due to a low boiling point of the potassium. On the other hand, the NOx catalyst of the present embodiment reduces the evaporation and splash of the potassium due to the affinity with respect to the acid material 30, and therefore, the potassium is steadily held in the catalyst layer 20.

Particularly if the catalyst layer 20 includes zeolite as the acid material 30, a more satisfactory result can be achieved since the zeolite has the cation exchange ability.

Figure 6:
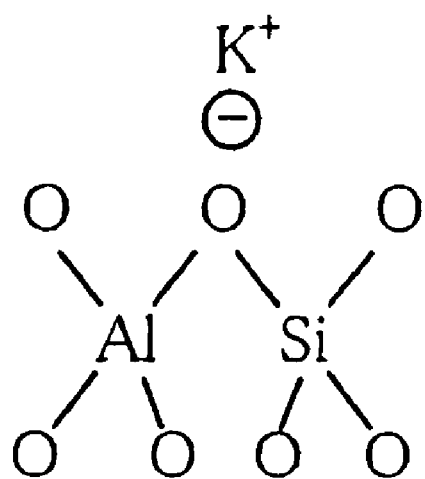
FIG. 6 is a conceptual view showing a potassium fixing operation by a cation exchange ability of zeolite.

More specifically, the NOx absorbing agent such as the potassium moving in the NOx catalyst may be ionized under the presence of high temperature vapor. If the catalyst layer 20 includes the zeolite, the NOx absorbing agent is fixed as ions due to the cation exchange ability of an acid point on the zeolite as shown in FIG. 6, and this prevents the movement of the NOx absorbing agent toward the carrier.

The zeolite has a three-dimensional mesh structure, and has a large specific surface. Thus, the zeolite is capable of screening molecules. The NOx absorbing agent such as the potassium is highly dispersed on the zeolite, and thus, further inhibits the movement of the NOx absorbing agent into the carrier.

Even when the internal combustion engine is run at the lean air-fuel ratio, the exhaust gas includes a small amount of HC. The zeolite has an excellent performance to fix the NOx absorbing agent and absorb the HC, and the HC absorbed onto the zeolite promotes the dissolution of the nitrate and sulfate of the NOx absorbing agent. More specifically, when the internal combustion engine is run at the lean air-fuel ratio, the zeolite having the HC absorbing performance continuously dissolves the nitrate and sulfate of the NOx absorbing agent by using the small amount of HC included in the exhaust gas, thereby recovering the NOx absorbing performance of the catalyst.

The zeolite layer 150 may be formed of various types of zeolite such as such as MFI type, Y type, X type, mordenite and ferrielite. It is necessary to select zeolite which conforms to the composition of the exhaust gas in view of the structure relevancy with an absorption HC specie.

The cation exchange ability and the heat-resisting performance of the zeolite depend on the composition of the zeolite. More specifically, the cation exchange ability is in inverse proportion to a ratio $SiO_2/AlO_2$ of the zeolite, and the heat-resisting performance is in proportion to this ratio. Therefore, increasing this ratio as much as possible improves the heatresisting performance of the catalyst, and decreasing the ratio reduces the dissipated amount of the NOx absorbing agent when the catalyst is used at a high temperature for a long period of time.

As stated above, the exhaust gas purifying catalyst of the present invention can steadily hold the NOx absorbing agent such as potassium in the catalyst layer 20 without moving and splashing it. This prevents the production of a compound with a different coefficient of thermal expansion from that of the cordierite carrier 10 in the cordierite carrier 10 to thereby prevent the crack of the cordierite carrier 10, which results from the production of the compound, and improve the durability of the exhaust gas purifying catalyst. This maintains the excellent exhaust gas purifying performance.

Figure 4:
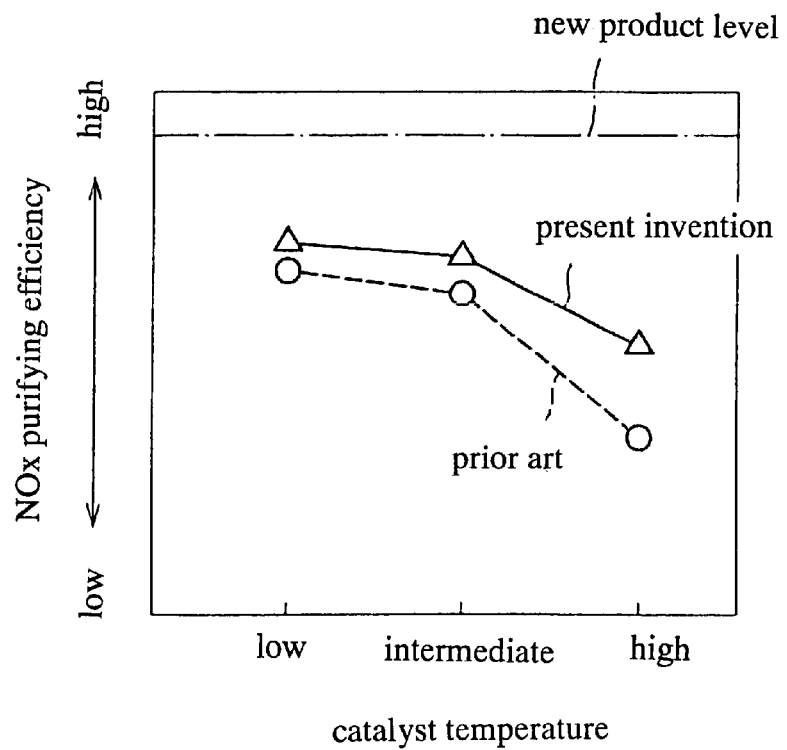
FIG. 4 is a view showing an NOx purifying efficiency of an exhaust gas purifying catalyst after the exhaust gas purifying catalyst is used at a high temperature for a long period of time.
Figure 5:
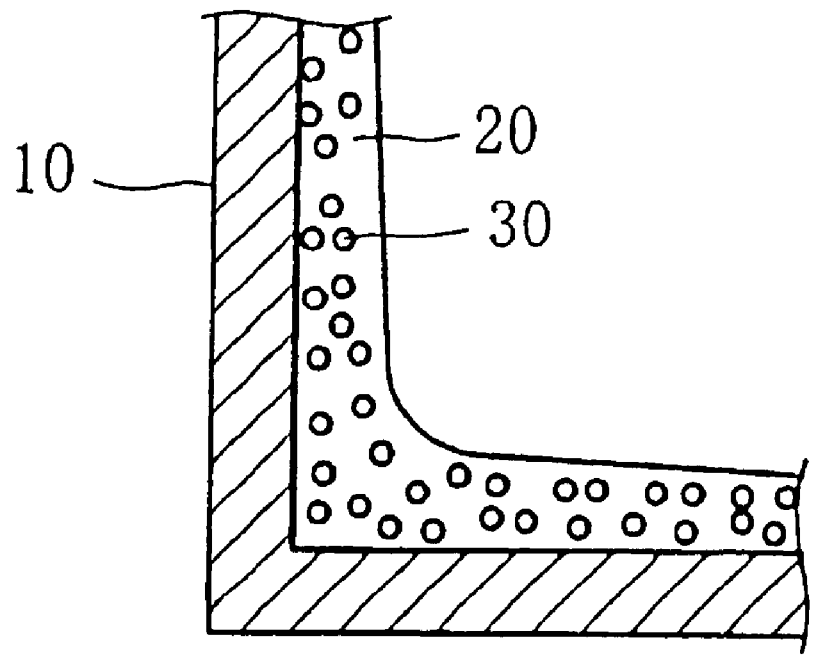
FIG. 5 is a partially-enlarged cross-sectional view showing a quarter of a shell in an exhaust gas purifying catalyst according to a second embodiment of the present invention in the case where an acid material is composed of particles or blocks.

When the NOx purifying efficiency of the NOx catalyst was checked after the NOx was used at a high temperature for a long period of time, it was found that the present invention maintained the higher NOx purifying efficiency regardless of the catalyst temperature as indicated by a solid line in FIG. 4 compared with the case where the catalyst layer, in which the acid material was not mixed, was used as in the prior art (indicated by a broken line).

One of substances for deteriorating the purifying performance of the NOx catalyst is a sulfate comprised of sulfur components. The exhaust gas purifying catalyst of the present invention can disperse and hold the NOx absorbing agent such as potassium in the catalyst layer 20, and this prevents the growth of such a sulfate.

In the above-described first embodiment, the acid material 30 is mixed as fine powder in the catalyst layer 20, but the acid material 30 may be relatively large particles or blocks if it is mixed in the catalyst layer 20. The present invention can be applied favorably to such a case (the second embodiment).

In the above-described first embodiment, the honeycomb cordierite carrier is used as a porous carrier, but the present invention can also be applied to an exhaust gas purifying catalyst provided with a carrier formed of material other than the cordierite. The use of a metal carrier prevents the splash of the absorbing agent and prevents the deterioration of the exhaust gas purifying performance of the catalyst, although the prevention of the permeation of the NOx absorbing agent into the carrier is nearly out of question. The honeycomb cordierite carrier is used, the cells thereof are not only quadrangular but also triangular and hexagonal.

There will now be described the first through fifth embodiments of the structure in which a layer of the acid material is formed in the catalyst layer.

Figure 7:
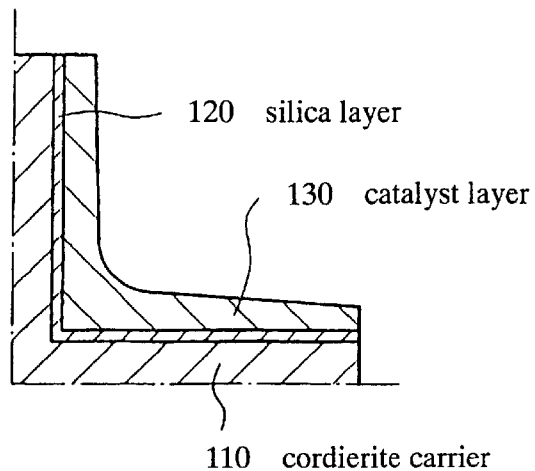
FIG. 7 is a partially-enlarged cross-sectional view showing a quarter of a shell in an exhaust gas purifying catalyst according to a third embodiment of the present invention.
Figure 8:
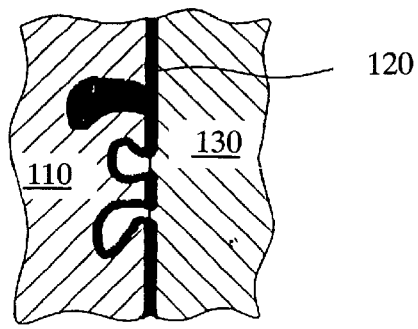
FIG. 8 is a conceptual view for describing the state wherein a silica layer is formed inside a pore of a cordierite carrier.

As is the case with the first embodiment, an exhaust gas purifying catalyst of the third through fifth embodiments has a honeycomb (monolith) cordierite carrier composed of many cells. FIG. 7 shows a part of a cell in the cordierite carrier. For example, the cells of a cordierite carrier 110 are quadrangular. A surface of the cordierite carrier 110 is coated with a silica layer 120, and a catalyst layer 130 is held on a surface of the silica layer 120. Potassium (K) and barium (Ba) are added as an NOx absorbing agent to the catalyst layer. The silica layer 120 functions as an inhibition layer for inhibiting the permeation of the potassium into the cordierite carrier 110 (more generally, a porous carrier).

The cordierite carrier 110 is produced by, for example, mixing alumina powder, silica powder and magnesia powder so that the ratio thereof can conform to the composition of a cordierite; diffusing the mixed powder in water; forming a solid content thereof in the shape of a honeycomb; and sintering the honeycomb compact.

For example, the silica layer 120 is formed on the surface of the cordierite carrier 110 in a manner described below. First, water-soluble salt of a silicon compound is diluted by water to prepare an aqueous solution with a predetermined concentration, and the cordierite carrier 110 is immersed in the aqueous solution. The aqueous solution of salt of the silicon compound is absorbed into the surface and a surface layer of the cordierite carrier 110 due to the hydrophilia of the cordierite 110. Then, the cordierite carrier 110 is dried to evaporate the water content, and the salt of the silicon compound is absorbed into the surface and the surface layer of the cordierite carrier 110. When the cordierite carrier 110 is heated, the salt of the silicon compound is dissolved to form the silica layer 120 on the surface of the cordierite carrier 110. In short, the cordierite carrier is coated with the silica layer 120.

An optimum concentration of the aqueous solution of salt of the silicon compound used for the formation of the silica layer 120 is mainly changed according to the hydrophilic characteristic of the cordierite carrier Accordingly, the elementary analysis is preferably performed with respect to the surface layer of the cordierite carrier by the EPMA method or the like in order to confirm a relationship between the concentration of the aqueous solution and the coated state in advance. Finding the optimum concentration of the aqueous solution of the salt of the silicon compound in advance acquires the optimum coated state that ensures the adhesiveness between the cordierite carrier and the catalyst layer, and prevents the permeation of the potassium into the silica layer. For example, the catalyst layer 130 is formed on the surface of the silica layer 120 in a manner described below. First, a slurry including powder that is mainly composed of noble metal such as platinum, an alkali metal such as the potassium, and an alkali earth metal such as barium is prepared. Then, the cordierite carrier 110 coated with the silica layer 120 is immersed in the slurry and is dried and sintered.

This obtains an NOx catalyst in which the cordierite carrier 110 is coated with the catalyst layer 130 through the silica layer 120. As is well known, this NOx catalyst is contained in a case through a cushioning member, and is arranged in an exhaust pipe of a lean combustion internal combustion engine.

This NOx catalyst absorbs NOx as nitrate as in exhaust gases under the operation of catalyst species dispersed in the catalyst layer 130 while the engine is run at a lean air-fuel ratio. While the engine is run at a rich air-fuel ratio, the NOx catalyst dissolves the nitrate and reduces the absorbed NOx to nitrogen, which is emitted from the NOx catalyst into the air.

If the internal combustion engine provided with the NOx catalyst is run for a long period of time, the NOx catalyst is exposed to a high temperature. If the NOx catalyst is a conventional NOx catalyst whose cordierite carrier is coated with a catalyst layer to which the potassium is added, the potassium moves to the cordierite carrier to react with silicon and the like in the carrier to produce a compound and crack the cordierite carrier as described previously. This damages the durability of the NOx catalyst. According to the elementary analysis by the EPMA method, the NOx catalyst of the present embodiment prevents the production of the compound of the potassium added to the catalyst layer 20 and the silica components of the cordierite carrier 10 even if the NOx catalyst is used at a high temperature for a long period of time. This is because the silica layer 120 prevents the potassium from moving from the catalyst layer 130 into the cordierite carrier 110. Since a compound with a different coefficient of thermal expansion from the cordierite carrier 110 is not produced in the cordierite carrier 110, the cordierite carrier 110 can be prevented from being cracked due to the production of such a compound.

There will now be described an exhaust gas purifying catalyst according to the fourth embodiment of the present invention.

Figure 9:
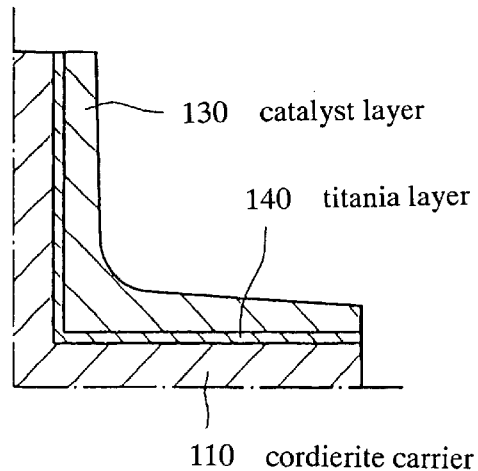
FIG. 9 is a partially-enlarged cross-sectional view showing a quarter of a shell in an exhaust gas purifying catalyst according to a fourth embodiment of the present invention.

As shown in FIG. 9, the exhaust gas purifying catalyst of the fourth embodiment is different from that of the third embodiment in that a titania layer 140, which is comprised mainly of a titanium dioxide ($TiO_2$), is formed as an inhibition layer instead of the silica layer 120. Otherwise, the exhaust gas purifying catalyst of the present embodiment has the same structure as that of the third embodiment. The exhaust gas purifying catalyst of the present embodiment can be manufactured in substantially the same manner as that of the third embodiment.

According to the elementary analysis by the EPMA method, the exhaust gas purifying catalyst of the present embodiment in which the titania layer is formed between the cordierite carrier 110 and the catalyst layer 130, the potassium added to the catalyst layer 130 is prevented from permeating the cordierite carrier 110 even if the catalyst is used at a high temperature for a long period of time. Since the permeation of the potassium is prevented, the exhaust gas purifying catalyst of the present embodiment has an excellent durability, and reduces the loss of the potassium from the catalyst layer 130 for the same reason as is the case with the silica layer.

There will now be described an exhaust gas purifying catalyst according to the fifth embodiment of the present invention.

Figure 10:
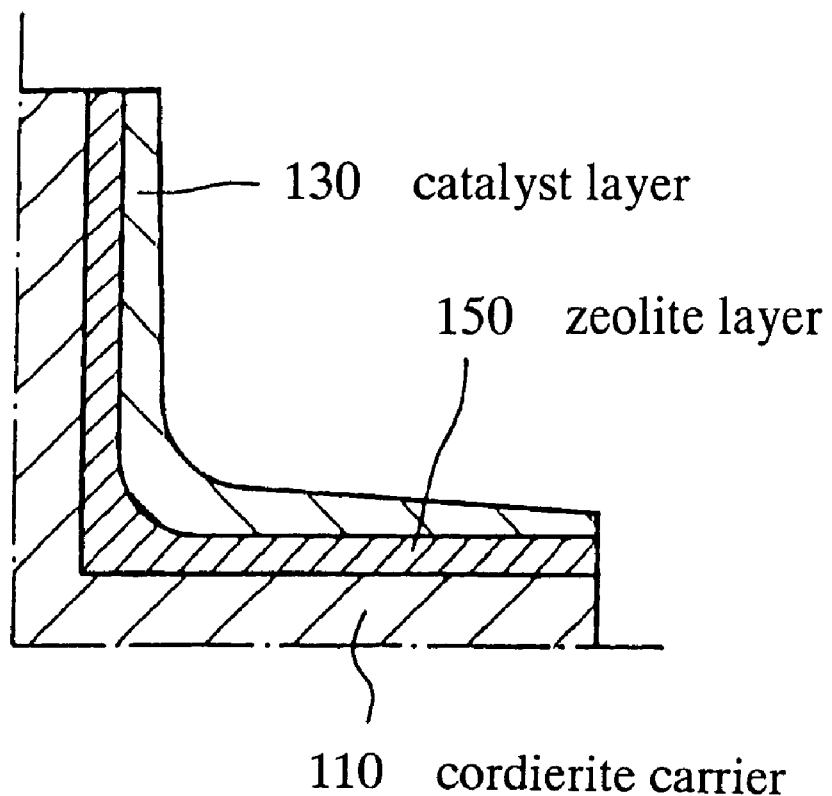
FIG. 10 is a partially-enlarged cross-sectional view showing a quarter of a shell in an exhaust gas purifying catalyst according to a fifth embodiment of the present invention.

As shown in FIG. 10, the exhaust gas purifying catalyst of the fifth embodiment is different from that of the third embodiment in that a zeolite layer 150 is formed as an inhibition layer, instead of the silica layer 120. Otherwise, the exhaust gas purifying catalyst of the present embodiment has the same structure as that of the third embodiment. The exhaust gas purifying catalyst of the present embodiment can be manufactured in substantially the same manner as that of the third embodiment.

When the zeolite layer 150 is formed in the cordierite carrier 110, zeolite components may be dispersed in an aqueous dispersing agent as is the case with the third embodiment, but the zeolite components may be dispersed may also be dispersed in an organic dispersing agent. It is possible to use an underwater dispersed matter (sol) and an electrified diffusing solution (colloid) of a hydrate of silica, alumina or the like.

Figure 11:
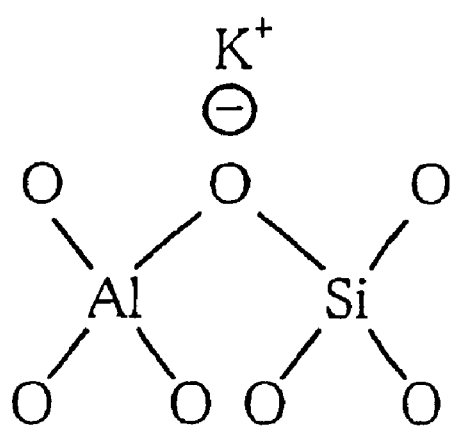
FIG. 11 is a conceptual view showing a potassium fixing operation by a cation exchange ability of zeolite, which constitutes an inhibition layer of a catalyst in FIG. 10.

In the catalyst of the present embodiment provided with the zeolite layer 150 as the inhibition layer, the zeolite layer 150 has an acid point with a cation exchange ability, and has an excellent ability to fix an absorbing agent (potassium in the present embodiment). The absorbing agent moving in the catalyst may be ionized under the presence of vapor at a high temperature. As shown in the conceptual drawing of FIG. 11, the absorbing agent such as the potassium is fixed as ions due to the cation exchange ability of the acid point on the zeolite layer 150. The zeolite layer 150 has a large specific surface due to its three-dimensional mesh structure. The potassium is highly dispersed on the zeolite that is constructed in the above-mentioned manner, and this makes it difficult for the potassium to permeate the cordierite carrier 110. The zeolite layer 150 has an excellent ability to absorb a reduced substance (e.g., reduced gas such as HC). Even when the internal combustion engine is run at the lean air-fuel ratio, the exhaust gas includes a slight amount of HC, and the HC absorbed onto the zeolite layer 150, which is capable of absorbing HC, facilitates the dissolution of the nitrate and the sulfate of the potassium. More specifically, the zeolite layer 150 continuously dissolves the nitrate and the sulfate by using the slight amount of HC included in the exhaust gas in order to recover the NOx absorbing performance of the catalyst.

The zeolite layer 150 of the present embodiment does not include any catalyst substances such as noble metal (e.g., platinum), and therefore, the platinum and the like do not take a catalytic action in the zeolite layer 150. Thus, there is no chemical reaction between the potassium fixed to the zeolite layer 150 and the SOx in the exhaust gas. This decreases the consumption of the absorbing agent with this chemical reaction, and maintains a high NOx absorbing performance of the catalyst.

The zeolite layer 150 may be formed of various types of zeolite such as MFI type, Y type, X type, mordenite and ferrielite. In this case, zeolite conforming to the composition of the exhaust gas is selected in view of the structure relevancy with the absorption HC specie.

The cation exchange ability of the zeolite is in inverse proportion to a ratio $SiO_2/AlO_2$ of the zeolite, and the heat-resisting performance of the zeolite is in proportion to this ratio. Therefore, this ratio is increased as much as possible in order to improve the heat-resisting performance according to the present embodiment. Preparing the components of the zeolite in such a way as to decrease the ratio $SiO_2/AlO_2$ makes it possible to improve the absorbing agent acquisition performance of the zeolite. This reduces the dissipated amount of the absorbing when the catalyst is used at a high temperature for a long period of time.

In order to evaluate the durability and the absorbing agent dispassion preventing performance of the exhaust gas purifying catalyst according to the present embodiment in which the zeolite layer 150 was formed between the cordierite carrier 110 and the catalyst layer 130, an NOx catalyst in which the zeolite was provided as an inhibition layer between the catalyst layer, to which the absorbing agent including the potassium was added, and the cordierite carrier was manufactured, and the potassium content of an unused NOx catalyst was found by an XRF method. Moreover, a bench test and a vehicle running test were conducted with respect to an engine provided with the NOx catalyst. As a result, the potassium content of the NOx catalyst that was used at a high temperature for a long period of time was found, and the dissipated amount of the potassium was found by dividing a difference in the potassium content before and after the use of the NOx catalyst was found as the potassium by the original potassium content.

Figure 12:
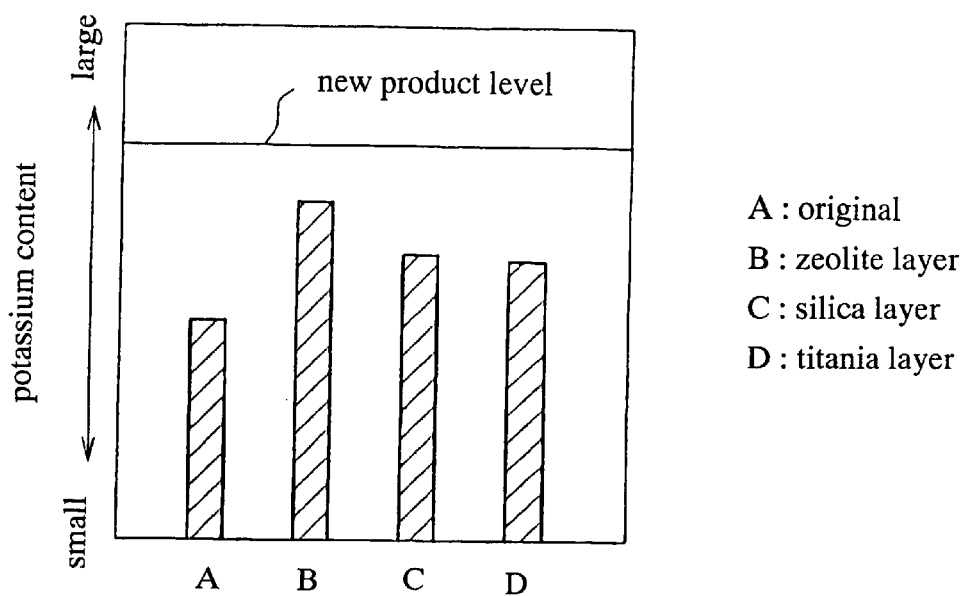
FIG. 12 is a view showing a potassium content after a catalyst in FIG. 10 is used at a high temperature for a long period of time, compared with an original catalyst, a catalyst in FIG. 7 and a catalyst in FIG. 9.
Figure 13:
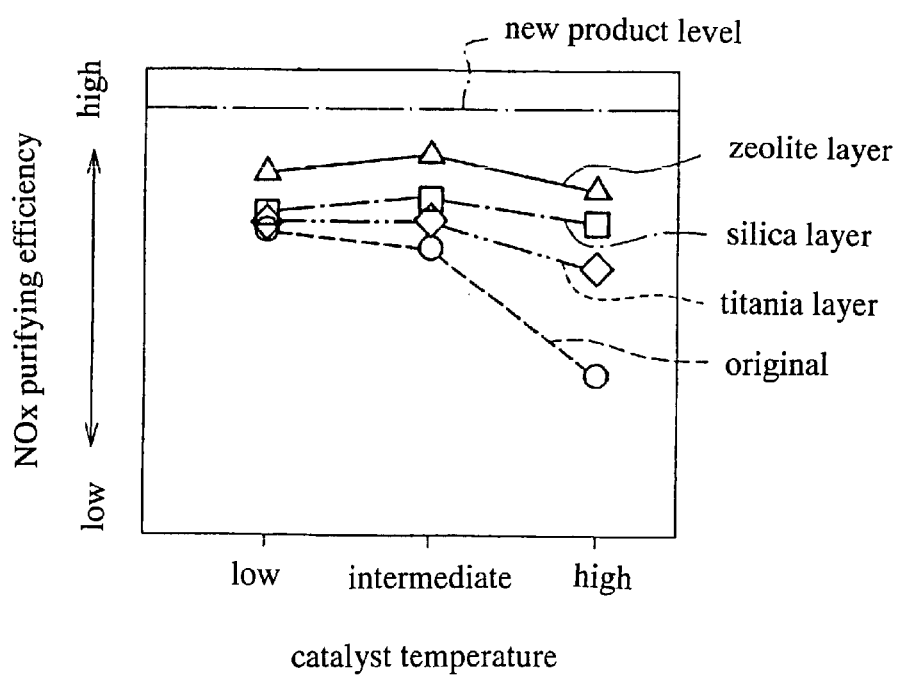
FIG. 13 is a view showing an NOx purifying efficiency after a catalyst in FIG. 10 is used at a high temperature for a long period of time, compared with an original catalyst, a catalyst in FIG. 7 and a catalyst in FIG. 9.

FIG. 12 shows the result of an experiment conducted with respect to the catalyst of the present embodiment having the zeolite layer 150 and the results of experiments conducted with respect to an original catalyst in which the catalyst layer is held on the carrier, the catalyst of the third embodiment having the silica layer 120 and the catalyst of the fourth embodiment having the titania layer 140.

As shown in FIG. 12, the dissipated amount of the potassium in the original catalyst was dozens of % to 50%, whereas the dissipated amount of the potassium in the catalyst of the present embodiment was ten plus several %. This means that the dissipated amount of the potassium as the absorbing agent from the catalyst can significantly be reduced. The dissipated amount of the potassium in the catalyst of the third and fourth embodiments was twenty plus several %.

As is the case with the third and fourth embodiments, the catalyst of the present embodiment was subjected to a bench test and a vehicle running test, and then, an elementary analysis was conducted with respect to a cut surface of the catalyst by the EPMA method. As a result, it was found that the potassium added to the catalyst layer 130 was prevented from permeating the cordierite carrier 110 even if the catalyst was used at a high temperature for a long period of time.

It should be understood, however, that there is no intention to limit the invention to the specific forms disclosed, but on the contrary, the invention is to cover all modifications.

For example, the honeycomb cordierite carrier is used as a porous carrier in the above embodiments, but the present invention can also be applied to an exhaust gas purifying catalyst provided with a carrier formed of material other than the cordierite. The use of a metal carrier prevents the splash of the absorbing agent and prevents the deterioration of the exhaust gas purifying performance of the catalyst, although the prevention of the permeation of the NOx absorbing agent into the carrier is nearly out of question. The honeycomb cordierite carrier is used, the shells thereof are not only quadrangular but also triangular and hexagonal.

The silica layer 120, which is comprised mainly of silicon dioxide, constitutes the inhibition layer according to the third embodiment; the titania layer, which is mainly comprised of titanium dioxide, constitutes the inhibition layer according to the fourth embodiment; and the zeolite layer 150 constitutes the inhibition layer according to the fifth embodiment. The components of the inhibition layer, however, should not be restricted to the silicon dioxide, the titanium dioxide and the zeolite.

More specifically, the inhibition layer may be composed of a layer with a high acidity by using other acid material than the silicon oxide. The habiting layer may also be composed of a layer with a high basicity, which is mainly comprised of basic materials (e.g., alkali metal such as barium (Ba) and barium oxide (BaO), instead of the titanium oxide. Moreover, the inhibition layer may be composed of a layer with a large specific surface, which is comprised mainly of a material with a large specific surface such as zeolite; a layer composed of an element compound with a heavy molecular weight, which is comprised mainly of a stable basic material with a heavy molecular weight such as a barium sulfate; and a layer with a small crystal lattice.

In a wide sense, the present invention can form the inhibition layer from an acid oxide including an acid substance; a composite oxide including an acid substance; and a material that never disturbs a reactivity between a nitrogen oxide and said absorbing agent; and a material that absorbs a reduced substance. The acid substance may include at least one material selected from transition elements of IV, V and VI groups and typical elements of IV, V and VI groups.

According to the third through fifth embodiments, one inhibition layer 120, 140 or 150 is formed on the external surface of the carrier 110 between the carrier 110 and the catalyst layer 130, but the number and position of inhibition layers should not be restricted to this. For example, one inhibition layer may be formed on the external surface of the catalyst layer. In the case of a catalyst with a plurality of catalyst layers, one or more inhibition layers may be formed at least one position between the carrier and the catalyst layer, inside the catalyst layer or on the external surface of the catalyst layer.

What is claimed is:

1. An exhaust gas purifying catalyst, comprising:
   a porous carrier;
   an inhibition layer on said porous carrier, said inhibition layer including an inhibiting agent; and
   a catalyst layer on said inhibition layer, said catalyst layer including an absorbing agent comprising potassium as one of alkali metal elements,
   wherein the inhibiting agent in said inhibition layer inhibits movement of said absorbing agent in said catalyst layer into said porous carrier.

2. An exhaust gas purifying catalyst according to claim 1, additionally comprising said inhibiting agent dispersed and mixed in said catalyst layer.

3. An exhaust gas purifying catalyst according to claim 2, wherein said inhibiting agent includes an acid oxide including at least one acid substance selected from transition elements of IV, V and VI groups and elements of IV, V and VI groups; a composite oxide including said at least one acid substance; and at least one material selected from the group composed of a material that never disturbs a reactivity between a nitrogen oxide and said absorbing agent and a material that absorbs a reduced substance.

4. An exhaust gas purifying catalyst according to claim 2, wherein:
   said inhibiting agent includes zeolite.

5. An exhaust gas purifying catalyst according to claim 2, wherein:
   said inhibiting agent includes an acid oxide comprised of at least one acid substance among silica, titanium and tungsten.

6. An exhaust gas purifying catalyst according to claim 2, wherein:
   said absorbing agent includes potassium; and
   said carrier is comprised of a porous carrier.

7. An exhaust gas purifying catalyst according to claim 1, wherein a layer of said inhibiting agent is formed on an external surface of said catalyst layer.

8. An exhaust gas purifying catalyst according to claim 7, wherein the layer of said inhibiting agent on the external surface of said catalyst includes an acid oxide including at least one acid substance selected from transition elements of IV, V and VI groups and elements of IV, V and VI groups; a composite oxide including said at least one acid substance; and at least one material selected from the group composed of a material that never disturbs a reactivity between a nitrogen oxide and said absorbing agent and a material that absorbs a reduced substance.

9. An exhaust gas purifying catalyst according to claim 7, wherein said inhibiting agent in the layer on the external surface of said catalyst includes zeolite.

10. An exhaust gas purifying catalyst according to claim 7, wherein said inhibiting agent in the layer on the external surface of said catalyst includes an acid oxide comprised of at least one acid substance among silica, titanium and tungsten.

11. An exhaust gas purifing catalyst according to claim 1, wherein said inhibiting agent includes zeolite.

12. An exhaust gas purifying catalyst according to claim 1, wherein said layer of said inhibiting agent includes an acid oxide comprised of at least one acid substance among silica, titanium and tungsten.

13. An exhaust gas purifying catalyst according to claim 1, wherein said inhibiting agent includes an acid oxide including at least one acid substance selected from transition elements of IV, V, and VI groups and elements of IV, V and VI groups; a composite oxide including said at least one acid substance; and a least one material selected from the group composed of a material that never disturbs a reactivity betweeen a nitrogen oxide and said absorbing agent and a material that absorbs a reduced substance.

* * * * *